US009573209B2

(12) United States Patent
Scheibel et al.

(10) Patent No.: US 9,573,209 B2
(45) Date of Patent: Feb. 21, 2017

(54) METHODS AND SYSTEMS FOR FORMING ALIGNED HOLES

(71) Applicant: The Boeing Company, Chicago, IL (US)

(72) Inventors: John P. Scheibel, Florissant, MO (US); James L. Scherer, St. Peters, MO (US)

(73) Assignee: THE BOEING COMPANY, Chicago, IL (US)

( * ) Notice: Subject to any disclaimer, the term of this patent is extended or adjusted under 35 U.S.C. 154(b) by 229 days.

(21) Appl. No.: 14/497,278

(22) Filed: Sep. 25, 2014

(65) Prior Publication Data

US 2016/0091294 A1    Mar. 31, 2016

(51) Int. Cl.
*G01B 15/00* (2006.01)
*B23D 77/12* (2006.01)
*B23P 19/10* (2006.01)

(52) U.S. Cl.
CPC ............... *B23D 77/12* (2013.01); *B23P 19/10* (2013.01)

(58) Field of Classification Search
CPC .................................... G01B 5/00; G01B 5/08
USPC ........................................ 33/286, 392, 301
See application file for complete search history.

(56) References Cited

U.S. PATENT DOCUMENTS

| | | | | |
|---|---|---|---|---|
| 5,568,265 A * | 10/1996 | Matthews | ............ | G01C 15/008 33/286 |
| 5,590,474 A * | 1/1997 | Lamb | ...................... | B25B 27/16 29/271 |
| 5,799,408 A * | 9/1998 | Sprayberry | ............. | B25B 27/16 29/271 |
| 6,986,209 B2 * | 1/2006 | Cook | ................... | G01C 15/008 33/286 |
| 7,040,030 B2 * | 5/2006 | Sawaguchi | .......... | G01C 15/002 33/281 |
| 7,793,423 B2 * | 9/2010 | Loftis | ...................... | F16L 1/10 33/286 |
| 7,886,450 B1 * | 2/2011 | Fiano | ..................... | G01C 15/02 33/286 |
| 8,606,540 B2 | 12/2013 | Haisty et al. | | |

(Continued)

OTHER PUBLICATIONS

Tools-N-Gizmos, Reamer Basics, http://www.tools-n-gizmos.com/info/Reamer_Basics.html, copyright 2001-2007.

(Continued)

*Primary Examiner* — Yaritza Guadalupe-McCall
(74) *Attorney, Agent, or Firm* — MH2 Technology Law Group LLP

(57) ABSTRACT

In one embodiment, a method for forming a pair of aligned holes is provided. The method comprises determining a diameter of a cleanup hole associated with a plurality of misaligned holes, in which the cleanup hole diameter may also correspond to a fastener diameter. Additionally, a tapered reamer is at least partially inserted into a gap defined by the plurality of misaligned holes. The tapered reamer has a longitudinal axis and may be configured such that the longitudinal axis aligns with a center of the cleanup hole when the tapered reamer is inserted into the gap defined by the plurality of misaligned holes. The plurality of misaligned holes may then be reamed with the tapered reamer to form the cleanup hole defined by the plurality of aligned holes having a same center and a same diameter.

20 Claims, 5 Drawing Sheets

(56) References Cited

U.S. PATENT DOCUMENTS

| | | | | |
|---|---|---|---|---|
| 2002/0062570 A1* | 5/2002 | Palumbo, II | ......... | G01C 15/002 33/286 |
| 2009/0033921 A1* | 2/2009 | Loftis | ....................... | F16L 1/10 356/138 |
| 2010/0095540 A1* | 4/2010 | Berkman | ............... | G01C 15/00 33/286 |
| 2012/0117813 A1* | 5/2012 | Stevenson | ............ | G01C 15/002 33/286 |
| 2015/0308819 A1* | 10/2015 | Hendricks | ................ | G01C 9/36 33/301 |
| 2016/0091294 A1* | 3/2016 | Scheibel | ................ | B23D 77/12 33/555.1 |

OTHER PUBLICATIONS

ANYiMeasuring, Bore Diameter Gauge, http://www.anyimeasuring.com/products/bore-diameter-gauge.html, copyright 2010.

Spartan Tool Sales; http://www.spartantoolsales.com/, website obtained as early as Jun. 15, 2014.

Irwin—11102—Step Drill Bits Minimum Hole Diameter (mm): 4.00 Maximum Hole Diameter (mm): 12.00; http://www.mscdirect.com/product/details/06560429?item=06560429, website obtained as early as Jun. 15, 2014.

Irwin—10220—Step Drill Bits Minimum Hole Diameter (Inch): 9/16 Maximum Hole Diameter (Inch): 1 ; http://www.mscdirect.com/product/details/06560809?item=06560809, website obtained as early as Jun. 15, 2014.

* cited by examiner

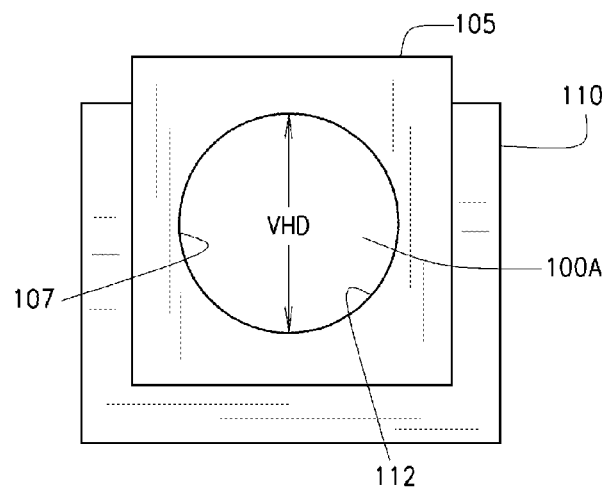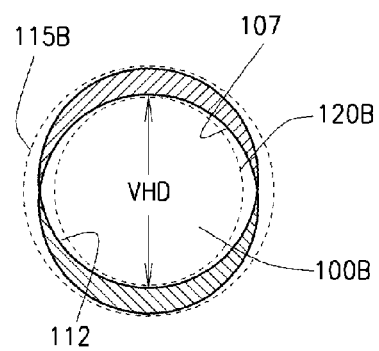
F I G . 1A  F I G . 1B
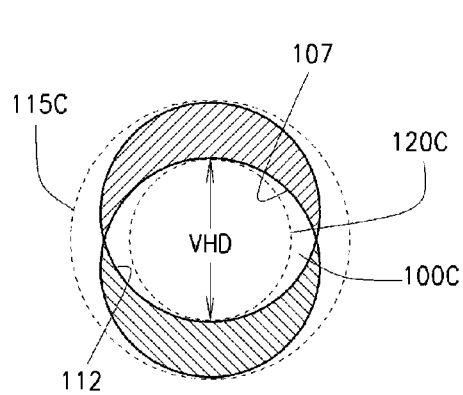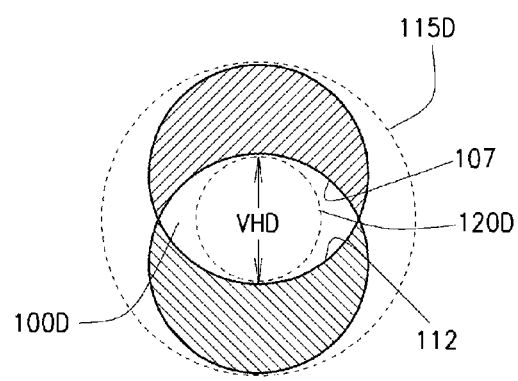
F I G . 1C  F I G . 1D
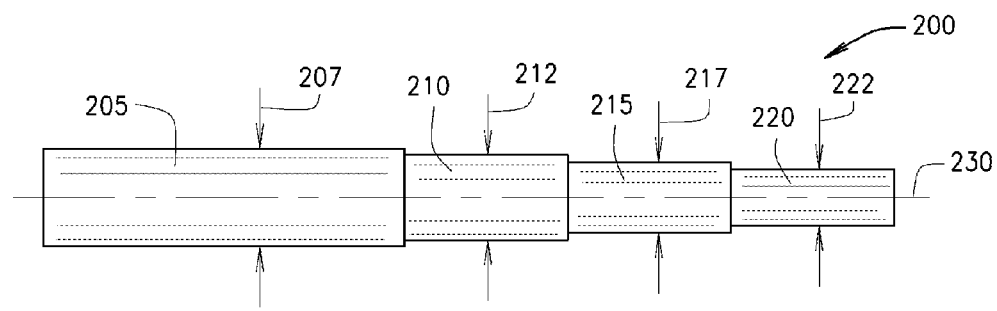
F I G . 2

METHODS AND SYSTEMS FOR FORMING ALIGNED HOLES

BACKGROUND

Field

Devices and methods are disclosed for producing aligned holes from misaligned holes. More particularly, systems and methods are disclosed for determining the size of a fastener to be used and for producing aligned holes from the misaligned holes.

Background

When multiple objects are to be connected together, fasteners of various sizes are commonly used. A circular hole is then drilled into each object, and ideally the objects are then placed next to one another such that the respective holes in the objects overlap each other and circumferences of the holes align. For the purposes hereof, when two or more such holes overlap with one another, the passageway through the holes is referred to as the gap. The virtual hole diameter of the gap is defined as the bisector of the gap with the smallest length. As will be understood, it is the length of the smallest bisector through the gap which determines whether a given fastener will fit through the (mis)aligned holes. Presuming the holes in the objects align properly, the gap should have the same shape as either of the holes, such that the virtual hole diameter of the gap is equal to the diameter of either hole. This is because with aligned holes, all bisectors of the gap have the same length, which is equal to the diameter of either hole. A fastener which would fit through either of the holes should therefore fit through the gap defined by the aligned holes as well, so as to secure the objects together.

However, a hole in one of the objects may not align properly with the corresponding hole in the other object when the objects are brought together. Misalignment of the holes reduces the size of the resulting gap through the objects, and specifically results in a gap in which the shortest bisector is shorter than the diameter of either original hole. Thus, the misaligned holes result in a gap with a virtual hole diameter that is smaller than the diameter of either hole and that could potentially be too small for the intended fastener to fit therethrough. As will be understood, a virtual hole that has a diameter equal to the virtual hole diameter is theoretically the diameter of the largest fastener which would fit through a misaligned set of holes.

A common technique for correcting misaligned holes is to drill or ream a cleanup hole through the misaligned holes, centered on one of the misaligned holes. A cleanup hole is preferably large enough in diameter that all of the misaligned holes fit fully within the cleanup hole, such that nothing of the original misalignment remains. Once the cleanup hole has been created, a fastener—which may also have a larger diameter than the diameter of the originally intended fastener—is placed through the cleanup hole to secure the objects together.

Conventionally, cleanup holes are created on a trial-and-error basis. Progressively larger and larger diameter cutters are used to incrementally remove minimal amounts of material from the misaligned holes. Multiple sizes of go/no-go gages and visual inspection are used to determine whether the newly-created cleanup hole meets fastener installation requirements. This trial-and-error method involves an element of subjectivity and is labor intensive. Special drill jigs are clamped to two or more adjacent holes or surfaces and are adjusted to center on the near-side misaligned hole. Not only is this process time consuming, but also requires a larger diameter hole to be produced to clean up the misaligned holes.

SUMMARY

In one embodiment, a method for forming a pair of aligned holes is provided. The method comprises determining a diameter of a cleanup hole associated with a plurality of misaligned holes, in which the cleanup hole diameter may also correspond to a fastener diameter. Additionally, a tapered reamer is at least partially inserted into a gap defined by the plurality of misaligned holes. The tapered reamer has a longitudinal axis and may be configured such that the longitudinal axis aligns with a center of the cleanup hole when the tapered reamer is inserted into the gap defined by the plurality of misaligned holes. The plurality of misaligned holes may then be reamed with the tapered reamer to form the cleanup hole defined by the plurality of aligned holes having a same center and a same diameter.

In another embodiment, a method for forming a pair of aligned holes is provided. The method comprises inserting a step gage into a gap defined by misaligned holes. The step gage may include at least a first section having a first diameter and a second section having a second diameter smaller than the first diameter. The first diameter may correspond to a first cleanup hole diameter and the second diameter may correspond to a second cleanup hole diameter larger than the first cleanup hole diameter. When it is found that the first section fit through the gap, it is determined that the virtual hole diameter of the misaligned holes corresponds to a first standard fastener diameter. A first standard fastener has the first standard diameter fastener. When it is found the first section does not fit through the gap and the second section does fit through the gap, it is determined that the virtual hole diameter of the gap is smaller than the first standard fastener diameter. A tapered reamer is used to form a second cleanup hole centered on a virtual hole associated with the virtual hole diameter, in which the diameter of the second cleanup hole allows a first oversized fastener to be inserted through the second cleanup hole.

In another embodiment, a system for forming aligned holes is provided. The system may comprise a step gage configured to be inserted through a gap defined by misaligned holes to determine a diameter of a cleanup hole. The step gage may include a first section having a first diameter corresponding to a first cleanup hole diameter, and a second section having a second diameter corresponding to a second cleanup hole diameter larger than the first cleanup hole diameter. The first and second sections of the step gage may be connected and may extend in series along a longitudinal axis of the step gage. The system may also comprise a tapered reamer having a longitudinal axis and configured such that the longitudinal axis aligns with a center of the cleanup hole when the tapered reamer is at least partially inserted into the gap defined by the pair of misaligned holes.

In one embodiment, a step gage comprises a first section having a diameter equal to about twice the diameter of an intended hole, minus a diameter of a first cleanup hole. The step gage also comprises a second section having a diameter equal to about twice the diameter of the intended hole, minus the diameter of a second cleanup hole which is larger than the diameter of the first cleanup hole. The first section and the second section are connected and extend in series along a longitudinal axis of the step gage.

The features, functions, and advantages that have been discussed can be achieved independently in various embodiments or may be combined in yet other embodiments further details of which can be seen with reference to the following description and drawings.

These and other advantageous features will be in part apparent and in part pointed out herein below.

BRIEF DESCRIPTION OF THE DRAWINGS

For a better understanding, reference may be made to the accompanying drawings in which:

FIG. 1A is a top plan view of aligned holes in overlapping objects.

FIG. 1B-1D illustrate examples of misaligned holes, in which the misalignment increases from FIG. 1B through FIG. 1D.

FIG. 2 illustrates a side elevation view of one example of a step gage according to an embodiment.

Figure 3A:
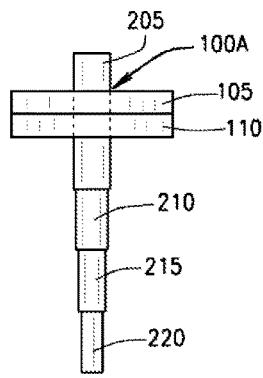
FIGS. 3A-3D illustrate side elevation views of the step gage of FIG. 2 being inserted into the holes of FIGS. 1A-1D.

While various modifications and alternative forms are envisioned, specific embodiments thereof are shown by way of example in the drawings and will herein be described in detail. It should be understood, however, that the drawings and detailed description presented herein are not intended to limit to the particular embodiment disclosed, but on the contrary, the intention is to cover all modifications, equivalents, and alternatives falling within the spirit and scope hereof as defined by the appended claims.

DESCRIPTION

According to one embodiment, various views are illustrated in FIGS. 1-6 and like reference numerals are being used consistently throughout to refer to like and corresponding parts for all of the various views and figures of the drawings. Also, please note that the first digit(s) of the reference number for a given item or part should correspond to the figure number in which the item or part is first identified.

Apparatuses and methods for creating aligned holes are provided. A step gage may have at least two steps of different diameters. These different diameters are sized and shaped to inform the user as to the appropriately sized cleanup hole needed to fully clean up the gap remaining between overlapping holes when such overlapping holes are misaligned. Once a cleanup hole size has been determined, a tapered reamer may be used which can be manually aligned on the misaligned holes, rather than on the near-side misaligned hole. The tapered reamer effectively aligns itself during use on the misaligned holes. Thus, a jig need not be used, and the resulting cleanup hole can be smaller than cleanup holes made using conventional processes. Forming the cleanup hole through the misaligned holes is also referred to herein as "cleaning up" the misaligned holes, which means forming concentrically-aligned holes having the same center and diameter through the existing misaligned holes.

One embodiment described herein teaches a step gage for determining a diameter of an appropriate cleanup hole. The details of the various embodiments can be better understood by referring to the figures of the drawing. Referring to FIG. 1A, two objects, such as plates 105, 110, are shown. Each plate 105, 110 includes a hole 107, 112 respectively, extending therethrough. Holes 107, 112 have a diameter approximately equal to an intended hole diameter (IHD). As shown in FIG. 1A, the plates 105, 110 have been brought together such that holes 107, 112 form a gap 100A therethrough.

Both of holes 107, 112 have a diameter approximately equal to the IHD. Each such hole 107, 112 is sized to receive a fastener of a predetermined diameter therethrough. As will be understood, if either of the respective holes 107, 112 in the two plates 105, 110 have exactly the same diameter as the intended fastener, the fastener may not fit through gap 100A even if the two holes 107, 112 are properly aligned. Therefore, the holes 107, 112 in the respective plates 105, 110 are typically drilled to have a diameter which is slightly larger than that of the intended fastener, although not so much larger that too much space would remain even with the intended fastener inserted therein. This is referred to as the least material condition of the holes 107, 112. The least material condition of these holes is therefore the circumstance in which each hole 107, 112 has the largest diameter within tolerance, such that the least material remains within tolerance.

As seen in FIG. 1A, the holes 107, 112 in the two plates 105, 110 are properly aligned, such that the hole 112 is not discretely visible below hole 107. All bisectors through gap 100A have the same length, which is equal to the diameter of holes 107, 112. Therefore, the gap 100A has a virtual hole diameter (VHD) equal to the diameter of the holes 107, 112. The creation of a cleanup hole may therefore be inappropriate. However, for the purposes hereof, the virtual hole diameter (VHD) and the diameter of the holes 107, 112 in FIG. 1A is equal to a first cleanup hole diameter.

In FIGS. 1B through 1D, the plates 105, 110 have been excluded for ease of reference. FIG. 1B illustrates holes 107, 112 as being slightly misaligned, such that the geometric center of hole 107 is spaced apart from the geometric center of hole 112. Unlike gap 100A in FIG. 1A, gap 100B in FIG. 1B has a shortest bisector, which is labeled VHD. As can be seen, the misalignment of the holes 107, 112 causes the VHD of the resulting gap 100B to be smaller than the diameter of either of holes 107, 112, (and thus smaller than the diameter hole associated with an intended fastener). A virtual hole 120B having the VHD of gap 100B is shown in phantom in FIG. 1B. This virtual hole 120B has a diameter (again, VHD) of the largest diametered circle which will fit within gap 100B.

Due to the misalignment of the holes 107, 112, a second cleanup hole 115B (also shown in phantom in FIG. 1B) may be created through the plates 105, 110 (not shown). Such second cleanup hole 115B preferably fully encompasses the holes 107, 112. A cleanup hole which does not fully encompass the holes 107, 112 is possible, but would result in a lower precision fit between the cleanup hole and the fastener.

FIG. 1C illustrates holes 107, 112 as being more misaligned than those shown in FIG. 1B, such that the geometric center of hole 107 is spaced farther from the geometric center of hole 112 than in FIG. 1B. Like gap 100B in FIG. 1B, gap 100C in FIG. 1C has a shortest bisector, which is again labeled VHD. The VHD of gap 100C is shorter than the VHD of gap 100B, because the misalignment of holes 107, 112 is greater in FIG. 1C than in FIG. 1B. As can be seen, the increased misalignment of the holes 107, 112 again causes the VHD of the resulting gap 100C to be smaller than the diameter of either of holes 107, 112. A virtual hole 120C having the VHD of gap 100C is shown in phantom in FIG. 1C. This virtual hole 120C has a diameter (again, VHD) of the largest diametered circle which will fit within gap 100C.

Due to the increased misalignment of the holes 107, 112 in FIG. 1C, a third cleanup hole 115C (also shown in phantom in FIG. 1C) may be created through the plates 105, 110 (not shown). Such third cleanup hole 115C preferably fully encompasses the holes 107, 112, and would therefore be larger in diameter than second cleanup hole 115B, due to the increased misalignment of holes 107, 112.

FIG. 1D illustrates holes 107, 112 as being even more misaligned than those shown in FIG. 1C, such that the geometric center of hole 107 is spaced even farther from the geometric center of hole 112 than in FIG. 1C. Like gap 100C in FIG. 1C, gap 100D in FIG. 1D has a shortest bisector, which is again labeled VHD. The VHD of gap 100D is shorter than the VHD of gap 100C, because the misalignment of holes 107, 112 is greater in FIG. 1D than in FIG. 1C. As can be seen, the increased misalignment of the holes 107, 112 again causes the VHD of the resulting gap 100D to be smaller than the diameter of either of holes 107, 112. A virtual hole 120D having the VHD of gap 100D is shown in phantom in FIG. 1D. This virtual hole 120D has a diameter (again, VHD) of the largest diametered circle which will fit within gap 100D.

Due to the additionally increased misalignment of the holes 107, 112 in FIG. 1D, a fourth cleanup hole 115D (also shown in phantom in FIG. 1D) may be created through the plates 105, 110 (not shown). Such fourth cleanup hole 115D preferably fully encompasses the holes 107, 112, and would therefore be larger in diameter than the third cleanup hole 115C, due to the increased misalignment of holes 107, 112.

FIG. 2 illustrates an example step gage 200 in accordance with an embodiment. As shown, step gage 200 includes four sections or steps: a first section 205 having a first diameter 207, a second section 210 having a second diameter 212, a third section 215 having a third diameter 217, and a fourth section 220 having a fourth diameter 222. These four sections 205-220 extend in series along the longitudinal axis 230 of the step gage 200. Sections 205-220 may be integrally formed of any suitable material including (but not limited to) metal, plastic, wood, etc. Alternatively, sections 205-220 may be formed separately and then connected together, for example by (but not limited to) welding, adhesive, etc. The diameters 207-222 of these four sections 205-220 are selected in order to inform a technician as to the whether the intended fastener size will fit within a gap defined by holes 107, 112. If the intended size fastener will not fit within the gap, the step gage 200 will indicate the appropriate size cleanup hole diameter which will fully encompass both misaligned holes (105B-105D, 110B-110D) and which will accept a fastener therethrough.

When attempting to determine the diameter of an appropriate cleanup hole, choices of the technician drilling the cleanup hole are somewhat constrained by the available fastener sizes. As will be understood, it makes little sense to create a cleanup hole which is too small for a given stocked fastener, but too large for the next larger sized fastener. The technician instead preferably determines the smallest size cleanup hole which will fully encompass the two misaligned holes 107, 112, but which also has an appropriate diameter for accepting therein one of the available fasteners. Of course, technicians generally stock standard-sized fasteners. For example, technicians often stock standard fastener sizes such as ¼ inch, 5/16 inch, ⅜ inch, 7 mm, 8 mm, 10 mm, 12 mm, etc. Many technicians also stock so-called oversized fasteners which are sized between the standard size fasteners. Thus, for example, between a ¼ inch (0.25 inch) fastener and a 5/16 inch (0.3125 inch) fastener, a manufacturer may stock a first-oversized fastener sized 0.2656 inch and a second-oversized fastener sized 0.2812 inch. 0.25<0.2656<0.2812<0.3125. This gives the technician additional options for cleanup hole sizes. As will be understood, these numbers are merely exemplary. Technicians may stock more or fewer oversized fasteners, or none at all.

The first through fourth sections 205-220 of step gage 200 have diameters 207, 212, 217, 222 with sizes selected to specifically inform the user as to the appropriate cleanup hole diameter. This is accomplished according to the following formula: the virtual hole diameter of the gap is equal to double the diameter of the intended hole (IHD), minus the diameter of the cleanup hole (CUD), which can be written as: VHD=(2×IHD)−CUD. As discussed above, the cleanup hole diameter (CUD) is the diameter of a cleanup hole which would produce concentrically-aligned holes have the same diameter. In the above formula, the intended hole diameter (IHD) can be the actual diameter of an intended fastener (e.g., 0.25 for a ¼ inch diameter fastener) or the least material condition diameter (e.g., 0.254 inches for a ¼ inch diameter fastener).

As noted above, there is a set of cleanup hole diameters corresponding to the diameters of the available fasteners. This set of cleanup hole diameters is, thus, a set of predetermined hole diameters that are preferred by the technician because holes having these diameters will accept available fasteners therein. One of these predetermined cleanup hole diameters (CUD) can be inserted into the above formula, along with the intended hole diameter (IHD). The resulting number will be equal to the virtual hole diameter (VHD) of the misaligned holes which would have a cleanup hole having the CUD value used in the formula. A step (also referred to as a "section") of gage 200 may then be created with the determined virtual hole diameter. If that step fits within the gap defined by a misaligned set of holes 107, 112, the technician knows that a cleanup hole having the CUD used in the equation for that step will clean up the misaligned holes.

The above-discussed non-limiting example of a first standard fastener having a first fastener diameter (e.g., 0.25 inches) will be used to further clarify the use of the above formula. The first standard fastener is associated with a hole having a least material condition diameter (e.g., 0.254 inches). For a situation as shown in FIG. 1A in which the holes 107, 112 are properly aligned, no cleanup hole is formed because the gap resulting from the overlapping holes 107, 112 has a first VHD that is equal to the least material condition diameter associated with the first standard fastener. In other words, the first cleanup hole diameter is already equal to the VHD. The first section 205 of step gage 200 would therefore simply have a diameter 207 of about the VHD. Thus, if the first section 205 of step gage 200 fits within the gap 100A created by aligned holes 107, 112 as shown in FIG. 3A, then the first standard fastener should fit through the gap 100A. Another way to confirm this, of course, is simply insert the first standard fastener through the gap 100A.

Figure 3B:
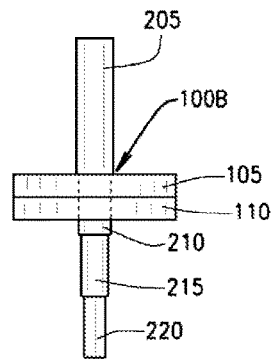

A first oversized fastener has a second fastener diameter that is larger than the first fastener diameter (e.g., a diameter of 0.2616 inches), and a second cleanup hole diameter (e.g., 0.2656 inches) is associated with the first oversized fastener. The formula results in a first virtual hole diameter (e.g., (2×0.254)−0.2656=0.2424 inches). The IHD has not changed from the example above, because the IHD is equal to the originally intended hole diameter of holes 107, 112. Thus, the diameter 212 of the second section 210 of step gage 200 is equal to the first virtual hole diameter (e.g., 0.2424 inches). If the second section 210 of step gage 200 fits into the gap 100B defined by the misaligned holes 107, 112 but the first section 205 does not, as shown in FIG. 3B, the gage 200 indicates that a cleanup hole having the second cleanup hole diameter will accept the first oversized fastener therein.

Figure 3C:
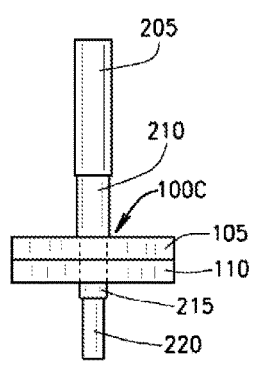

A second oversized fastener has a third fastener diameter larger than the second fastener diameter (e.g., 0.2772 inches), and a third cleanup hole diameter (e.g., 0.2812 inches) is associated with the second oversized fastener. The formula results in a second virtual hole diameter (e.g., (2×0.254)−0.2812=0.2268 inches). Thus, the diameter 217 of the third section 215 of step gage 200 is equal to the second virtual hole diameter (e.g., 0.2268 inches). If the third section 215 of step gage 200 fits into the gap 100C defined by the misaligned holes 107, 112 but the first and second sections 205, 210 do not, as shown in FIG. 3C, the gage 200 indicates that a cleanup hole having the third cleanup hole diameter will accept the second oversized fastener.

Figure 3D:
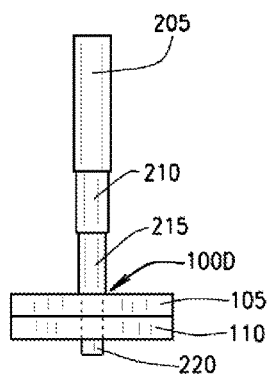

A second standard fastener has a fourth fastener diameter larger than the third fastener diameter (e.g., 0.3125 inches), and a fourth cleanup hole diameter (e.g., 0.3165) inches is associated with the second standard fastener. The formula results in a third virtual hole diameter (e.g., (2×0.254)−0.3125=0.1955 inches). Thus, the diameter 222 of the fourth section 220 of step gage 200 is equal to the third virtual hole diameter (e.g., 0.1955 inches). If the fourth section 220 of step gage 200 fits into the gap 100D defined by the misaligned holes 105D, 110D but the first through third sections 205-215 do not, as shown in FIG. 3D, the gage 200 indicates that a cleanup hole having the fourth cleanup hole diameter will accept the second standard fastener.

Figure 3E:
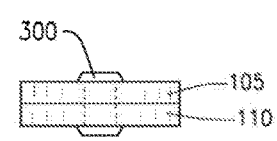
FIG. 3E illustrates a fastener inserted into the cleanup hole securing two or more objects together.

As will be understood, the same formula can be used with various fastener diameters and various cleanup hole diameters (which correspond to various oversized/standard diameter fasteners) to determine the appropriate diameter for a given step on gage 200. When two oversized fasteners are available with diameters between two standard diameter fasteners, a step gage 200 as shown in FIGS. 2 and 3A-3D can be created with four steps: a first step 205 corresponding to the first standard fastener, a second step 210 corresponding to the first oversize fastener, a third step 215 corresponding to the second oversized fastener, and a fourth step 220 corresponding to the second standard fastener. FIG. 3E depicts a fastener 300 that secures plates 105, 110 together inserted into the cleanup hole.

It is noted that fewer or more steps could be included in the step gage 200. For example, when no oversized fasteners are available, a two-step gage having one step corresponding to the first standard fastener and another step corresponding to the second standard fastener. Further, when only a single oversized fastener is available, a three-step gage may be used. Alternatively, regardless of the number of oversized fasteners available, step gages with any desired number of steps can be used. The four-step gage 200 shown in FIG. 2 and the specific diameters discussed above are therefore merely exemplary, and should be considered a non-limiting example.

Figure 4:
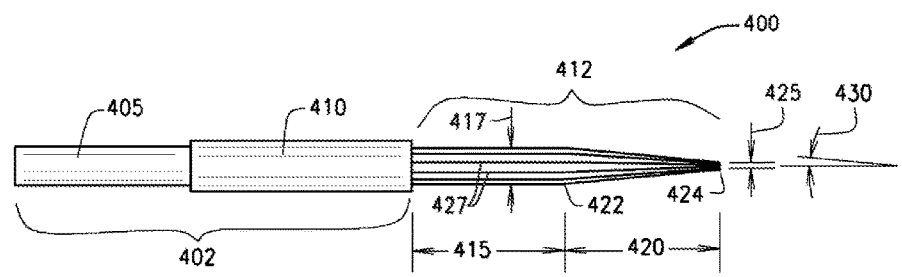
FIG. 4 illustrates a side elevation view of one example of a tapered reamer according to an embodiment.

Once the appropriate cleanup hole diameter is determined, a device such as reamer 400 shown in FIG. 4 may be used to create the cleanup hole. As shown, reamer 400 is a tapered reamer 400, and includes a shaft 402. Shaft 402 may include a chuck shaft 405 and a bushing shaft 410. Tapered reamer 400 also includes a lead portion 412 extending from the shaft 402. The lead portion 412 includes a final diameter section 415 that has a final diameter 417. Extending from the final diameter section 415 is a tapered diameter section 420. The tapered diameter section 420 includes a proximal end 422 abutting the final diameter section 415 and a distal end 424 opposite the proximal end 422. The proximal end 422 has the final diameter 417, and the distal end 424 has a beginning diameter 425. Accordingly, the tapered diameter section 420 decreases in diameter from the final diameter 417 to the beginning diameter 425 from the proximal end 422 toward the distal end 424. The lead portion 412 preferably includes one or more flutes 427. Flutes 427 may be straight, helical, or any other suitable configuration.

Preferably, the tapered diameter section 420 tapers from the final diameter 417 to the beginning diameter 425 at a predetermined angle 430. The predetermined angle 430 may be between about 0.5 degrees to 1 degree per side (i.e., half-angle), which gives about 1-2 degrees angle overall. When manually positioned at the center of a virtual hole 120B, 120C, 120D the angle 430 of tapered diameter section 420 allows the reamer 400 to remain at approximately the center of the virtual hole 120B, 120C, 120D. This is referred to as positional accuracy. The angle 430 is selected to avoid using a jig to position and hold the reamer appropriately. Further, by centering on the virtual hole 120B, 120C, 120D, a smaller diameter cleanup hole can be created, as compared to centering a reamer on only one of the holes 107, 112 (which also generally entails the use of a jig).

The angle 430 is derived as a balance between competing factors. On one hand, a more gradual taper (e.g., a small value of angle 430) would lead to a tapered diameter section 420 having a greater length than a length of section 420 having a larger angle 430. On the other hand, the angle 430 of the tapered diameter section 420 guides the tapered reamer 400 through the center of the virtual hole 120B, 120C, 120D and gap 100B, 100C, 100D during reaming. A less gradual taper (e.g., a larger value of angle 430) may increase error in the positional accuracy of the tapered reamer 400 (i.e., the reamer 400 may stray from the center of the virtual hole 120B, 120C, 120D during reaming). Indeed, it has been found that a larger value of angle 430 results in a tapered reamer 400 which may not remain centered on the center of the virtual hole 120B, 120C, 120D during reaming. Charts illustrated in FIGS. 5A and 5B provide exemplary relationships based on the angle of the tapered diameter section 420 that can be used select the angle of taper.

Figure 5A:
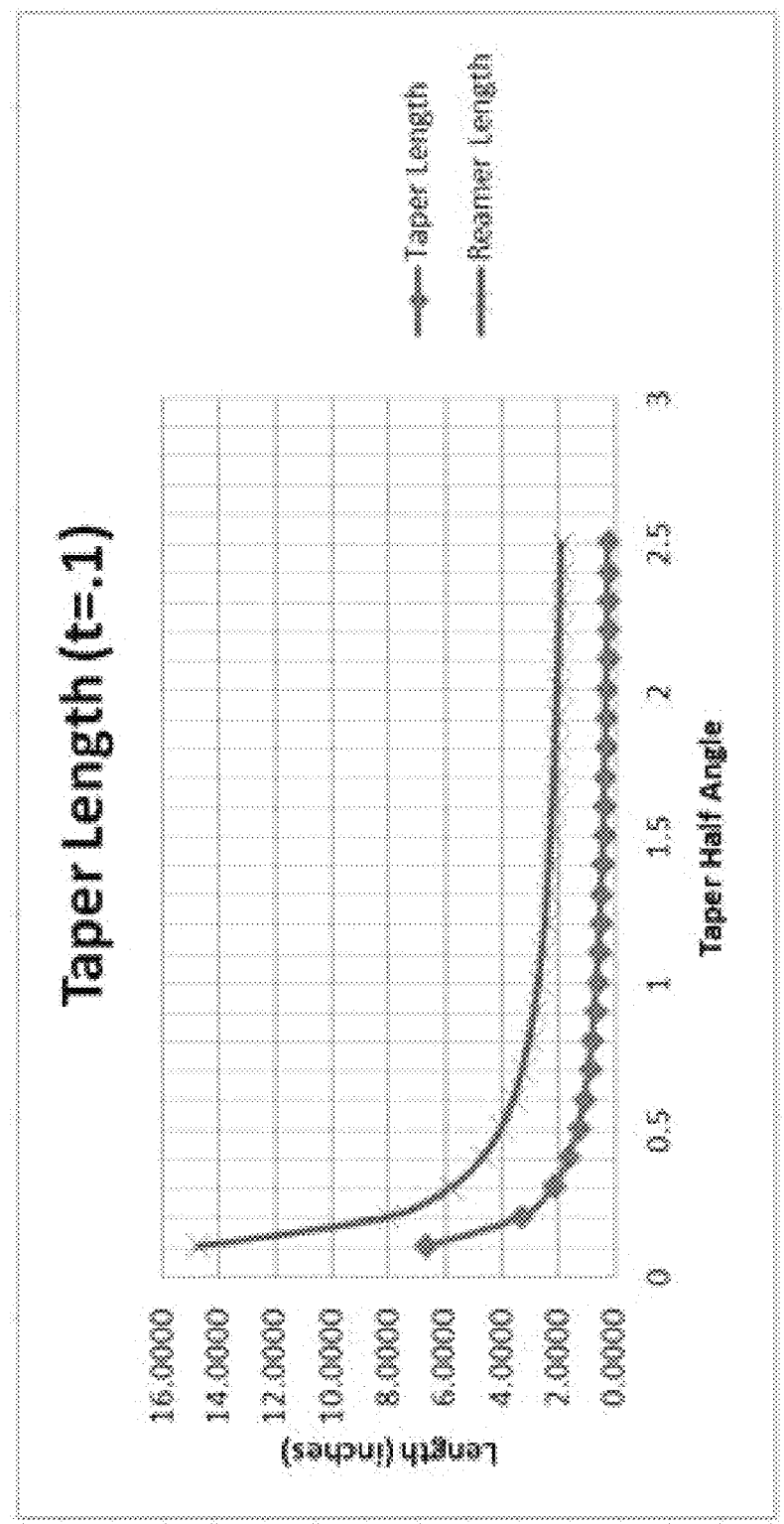
FIG. 5A is a graph showing the relationship between the length of a reamer's taper and the degrees of taper.
Figure 5B:
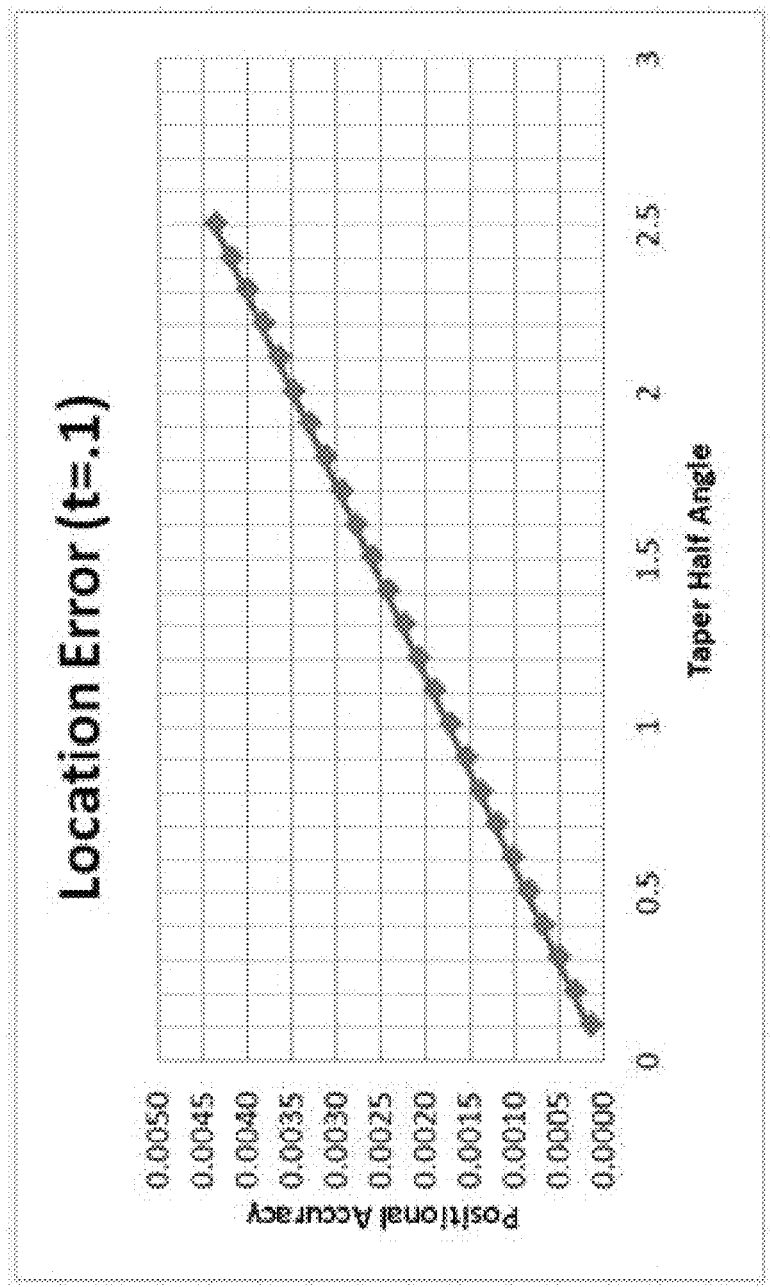
FIG. 5B is a graph showing the relationship between the positional accuracy of a tapered reamer and the degrees of taper.

FIG. 5A illustrates the relationship between the angle (in degrees) of taper of the tapered diameter section 420 as compared to the length of tapered diameter second 420, when the each of the objects being secured together (e.g. plates 105, 110) has a thickness "t" of 0.1 inches. As can be seen, below about 0.5 degrees of taper, the length of the tapered diameter section 420 increases exponentially. Therefore, degrees of taper below about 0.5 degrees may be undesirable in some applications. FIG. 5B illustrates the relationship between the angle (in degrees) of taper of the tapered diameter section 420 as compared to the positional accuracy (in inches) of the tapered reamer 400 (in which lower numbers are more accurate). As can be seen, above about 1 degrees of taper, the positional accuracy of the reamer 400 may not have the accuracy specified for a high-accuracy manufacturing process, such as manufacturing machinery. Therefore, an angle of taper below 1 half-degree would be more desirable for the high-accuracy manufacturing process.

Figure 6:
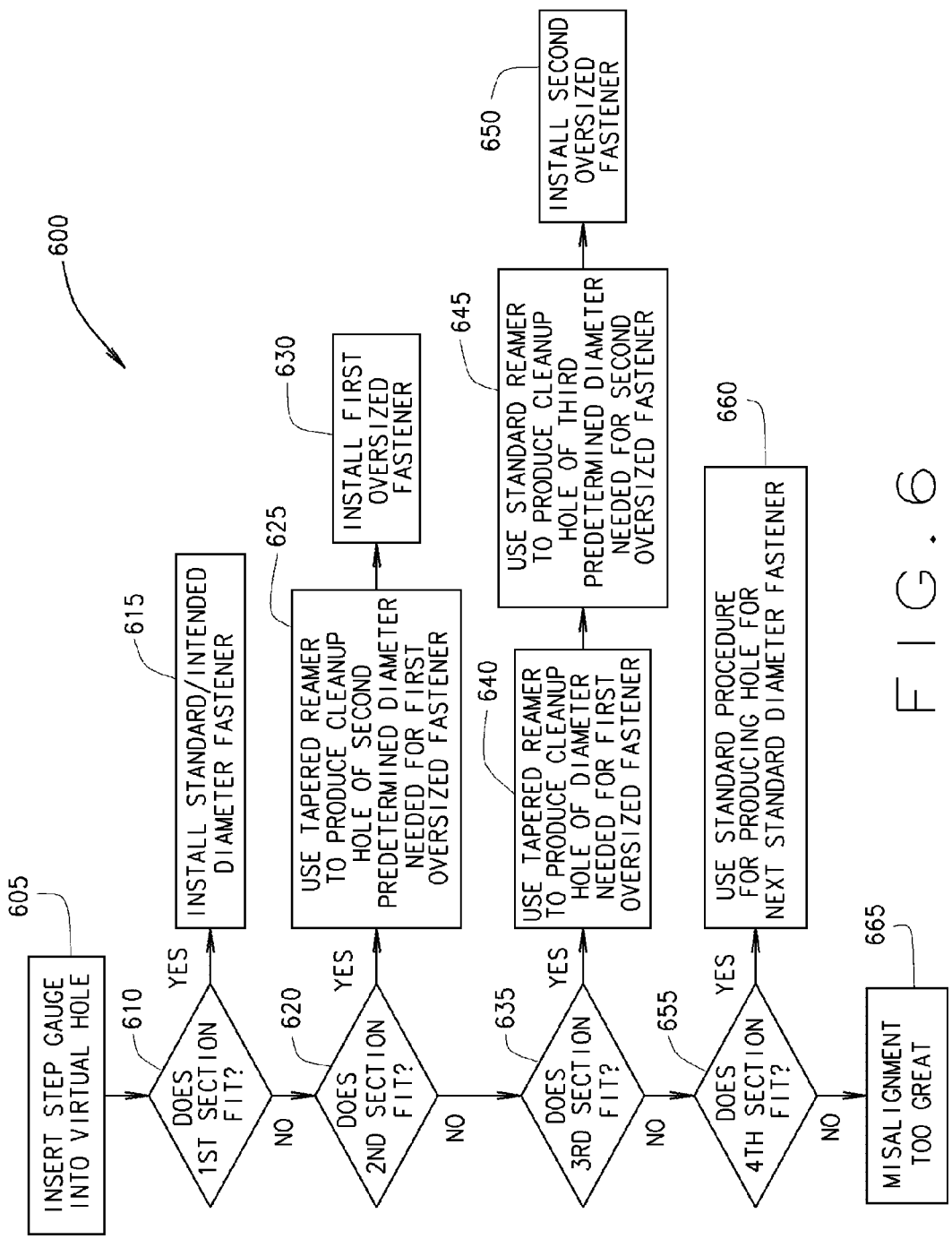
FIG. 6 illustrates a flow chart for using a step gage and tapered reamer.

FIG. 6 illustrates a flow chart of a method 600 for using the step gage 200 and tapered reamer 400, according to an example embodiment. At step 605, the step gage 200 is inserted into the gap, such as gap 100A-100D defined by at least two overlapping holes, such as holes 107 and 112. At step 610, a determination is made as to whether the first section 205 of the gage 200 fits within the gap. If the first section 205 fits through the gap, at step 615, the first standard fastener may be inserted into the gap. If the first section 205 does not fit through the gap, at step 620, a determination is made as to whether the second section 210 of the gage 200 fits within the gap. If the second section 210 fits through the gap, at step 625, the tapered reamer 400 is used to produce a cleanup hole having the second cleanup hole diameter such that the cleanup hole accepts the first oversized fastener having the second fastener diameter. The tapered diameter section 420 is inserted at least partially into the gap, and the misaligned holes are cleaned up to the diameter of the final diameter section 415, which is approximately equal to the second cleanup hole diameter. At step 630, the corresponding first oversized fastener can be inserted through the cleanup hole.

At step 620, if the second section 210 does not fit through the gap, a determination is made at step 635 as to whether the third section 215 of the gage 200 fits within the gap. If the third section 215 fits through the gap, at step 640, the tapered reamer 400 is used to produce an initial cleanup hole having the second cleanup hole diameter such that the initial cleanup hole would accept the first oversized fastener. At step 645, a standard reamer is then used to enlarge the initial cleanup hole to a final cleanup hole having the third cleanup hole diameter to accept the second oversized fastener having the third fastener diameter. A standard reamer may be a reamer without a tapered diameter section, in which the lead portion has a substantially uniform diameter throughout its length. After the tapered reamer 400 has produced an initial cleanup hole at step 640, a standard reamer may be used with acceptable positional accuracy. More specifically, the tapered reamer 400 produces an initial cleanup hole having a center aligned with a center of the virtual hole that was associated with the resulting gap. Accordingly, the standard reamer may remain centered on the center of the initial cleanup hole formed by the tapered reamer 400, and the use of a jig to position and hold the standard reamer on the center of the initial cleanup hole can be avoided. At step 650, the second oversized fastener can be inserted through the final cleanup hole.

At step 635, if the third section 215 does not fit though the gap, a determination is made at step 655 as to whether the fourth section 220 of the gage 200 fits within the gap. If the fourth section 220 can be inserted through the gap, at step 660, a jig and reamer (or other drilling tool, as appropriate) for producing a hole having the fourth cleanup hole diameter for the accepting next standard sized fastener are utilized. The jig and reamer of step 660 may be utilized when the virtual hole has a sufficiently small diameter that the tapered diameter section 420 of tapered reamer 400 may not properly guide the tapered reamer 400 through the center of a virtual hole with. At step 660, if the virtual hole has a diameter which is large enough to allow use of the tapered reamer 400 without a jig, the fourth cleanup hole may be produced according to steps similar to steps 640 and 645, with at least one progressively larger reamer used after the tapered reamer 400 has been used. If, at step 655, the fourth section 220 does not fit within the gap, at step 665 the misaligned holes are flagged for further processing.

As will be understood, method 600 specifically relates to a four-step gage 200 that can be used when two oversized fasteners and two standard fasteners are available. A modified methodology would apply to a step gage with a different number of sections. For example, when only a single oversized fastener and two standard fasteners are available, a three step gage may be used and method steps 635-650 may be omitted. Additional method steps may be added for step gages with additional steps.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims cover such modifications and applications that do not depart from the spirit and scope of the present implementation. Accordingly, the specification and drawings are to be regarded in an illustrative rather than a restrictive sense.

The steps of the methods described herein need not be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

The various examples shown above illustrate a step gage, a tapered reamer, and a method for using same. A user may choose any of the above embodiments, or an equivalent or variation thereof, depending upon the desired application. In this regard, it is recognized that various forms of the subject step gage and tapered reamer could be utilized without departing from the spirit and scope hereof.

Further, the disclosure comprises embodiments according to the following clauses:

Clause 1. A method for forming a plurality of aligned holes, the method comprising:
determining a diameter of a cleanup hole associated with a plurality of misaligned holes, the cleanup hole diameter corresponding to a fastener diameter;
at least partially inserting a tapered reamer into a gap defined by the plurality of misaligned holes, the tapered reamer having a longitudinal axis and configured such that the longitudinal axis aligns with a center of the cleanup hole when the tapered reamer is inserted into the gap defined by the plurality of misaligned holes;
reaming the plurality of misaligned holes with the tapered reamer to form the cleanup hole defined by the plurality of aligned holes having a same center and a same diameter.

Clause 2. The method of clause 1, wherein the step of determining a diameter of a cleanup hole further includes the steps of:
inserting a step gage into the gap defined by the plurality of misaligned holes, the step gage including at least a first section having a first diameter and a second section having a second diameter smaller than the first diameter, the first diameter corresponding to a first cleanup hole diameter and the second diameter corresponding to a second cleanup hole diameter larger than the first cleanup hole diameter; and
determining the diameter of the cleanup hole based on whether one or more of the first and second sections fit within the gap.

Clause 3. The method of clause 2, wherein the step of reaming the plurality of misaligned holes further comprises reaming the plurality of misaligned holes to form the cleanup hole having a first cleanup hole diameter, wherein the first cleanup hole diameter allows a first standard fastener to be inserted through the cleanup hole.

Clause 4. The method of clause 2, wherein the step of reaming the plurality of misaligned holes further comprises reaming the plurality of misaligned holes to form the cleanup hole having a second cleanup hole diameter, wherein the second cleanup hole diameter allows a first oversized fastener to be inserted through the cleanup hole.

Clause 5. A method for forming aligned holes, the method comprising:
inserting a step gage into a gap defined by misaligned holes, the step gage including at least a first section having a first diameter and a second section having a second diameter smaller than the first diameter, the first diameter corresponding to a first cleanup hole diameter and the second diameter corresponding to a second cleanup hole diameter larger than the first cleanup hole diameter;
when the first section fits through the gap, determining that a virtual hole diameter of the misaligned holes corresponds to a first standard fastener diameter, wherein a first standard fastener has the first standard fastener diameter; and
when the first section does not fit through the gap and the second section does fit through the gap:
determining that the virtual hole diameter of the gap is smaller than the first standard fastener diameter; and
using a tapered reamer to form a second cleanup hole centered on a virtual hole associated with the virtual hole diameter, wherein the diameter of the second cleanup hole allows a first oversized fastener to be inserted through the second cleanup hole.

Clause 6. The method of clause 5, wherein the step gage further includes a third section having a third diameter smaller than the second diameter and a fourth section having a fourth diameter smaller than the third diameter, the third diameter corresponding to a third cleanup hole diameter larger than the second cleanup hole diameter and the fourth diameter corresponding to a fourth cleanup hole diameter larger than the third cleanup hole diameter, the method further comprising:
when the third section fits through the gap and the first and second sections do not fit through the gap:
determining that the virtual hole diameter of the gap defined by the misaligned holes corresponds to a third cleanup hole diameter;
using the tapered reamer to form an initial cleanup hole having the diameter of the second cleanup hole centered on the virtual hole associated with the virtual hole diameter; and
using a standard reamer to form a third cleanup hole having the third cleanup hole diameter centered on the geometric center of the initial cleanup hole, wherein the third cleanup hole diameter allows a second oversized fastener to be inserted through the third cleanup hole; and
when the fourth section fits through the gap and the first, second, and third sections do not fit through the gap:
determining that the virtual hole diameter of the gap corresponds to a fourth cleanup hole diameter;
determining that a fourth cleanup hole having the fourth cleanup hole diameter centered on the virtual hole associated with the virtual hole diameter is appropriate, wherein the fourth cleanup hole diameter allows a second standard fastener to be inserted through the fourth cleanup hole.

Clause 7. The method of clause 6, wherein upon determining that the fourth section fits within the gap and that the first, second, and third sections do not:
forming the fourth cleanup hole centered on the virtual hole associated with the virtual hole diameter.

Clause 8. The method of clause 7, wherein the step of forming the fourth cleanup hole further comprises the steps of:
using the tapered reamer to form an initial cleanup hole having the diameter of the second cleanup hole centered on the virtual hole associated with the virtual hole diameter;
using the first standard reamer to form the third cleanup hole having the third cleanup hole diameter centered on the geometric center of the initial cleanup hole
using a second standard reamer to form the fourth cleanup hole having the fourth cleanup hole diameter centered on the geometric center of the third cleanup hole.

Clause 9. The method of clause 7, wherein the step of forming the fourth cleanup hole further comprises the step of:
using a second standard reamer and a jig to form the fourth cleanup hole having the fourth cleanup hole diameter centered on the virtual hole associated with the virtual hole diameter.

Clause 10. The method of clause 5, wherein the step of using a tapered reamer further comprises the step of centering the reamer on the misaligned holes without the use of a jig.

Clause 11. A system for forming aligned holes, the system comprising:
a step gage configured to be inserted through a gap defined by misaligned holes to determine a diameter of a cleanup hole, said step gage comprising:
a first section having a first diameter corresponding to a first cleanup hole diameter; and
a second section having a second diameter corresponding to a second cleanup hole diameter larger than the first cleanup hole diameter, the first and second sections being connected and extend in series along a longitudinal axis of the step gage; and
a tapered reamer having a longitudinal axis and configured such that the longitudinal axis aligns with a center of the cleanup hole when the tapered reamer is at least partially inserted into the gap defined by the misaligned holes.

Clause 12. The system of clause 11, wherein the step gage further comprises at least a third section and a fourth section which correspond to a third cleanup hole diameter and a fourth cleanup hole diameter, respectively.

Clause 13. The system of clause 11, wherein said tapered reamer comprises a tapered diameter section having a beginning diameter which is smaller than a final diameter, the tapered diameter section tapering from the final diameter to the beginning diameter at an angle of between about 0.5 degrees and about 1.0 degrees per side.

Clause 14. A step gage comprising:
a first section having a diameter equal to about twice a diameter of an intended hole, minus a diameter of a first cleanup hole; and
a second section having a diameter equal to about twice the diameter of the intended hole, minus a diameter of a second cleanup hole which is larger than the diameter of the first cleanup hole, wherein said first section and said second section are connected and extend in series along a longitudinal axis of the step gage.

Clause 15. The step gage of clause 14, wherein the diameter of the first cleanup hole allows a first standard fastener to be inserted through the first cleanup hole.

Clause 16. The step gage of clause 14, wherein the diameter of the second cleanup hole allows a first oversized fastener to be inserted through the second cleanup hole.

Clause 17. The step gage of clause 14, further comprising: a third section having a diameter equal to about twice the diameter of the intended hole, minus a diameter of a third cleanup hole which is larger than the diameter of the second cleanup hole; and
a fourth section having a diameter equal to about twice the diameter of the intended hole, minus a diameter of a fourth cleanup hole which is larger than the third cleanup hole; and
wherein the first, second, third, and fourth sections are connected and extend in series along the longitudinal axis of the step gage.

Clause 18. The step gage of clause 17, wherein:
the diameter of the intended hole is approximately equal to the diameter of the first cleanup hole;
the diameter of the second cleanup hole allows a first oversized fastener to be inserted through the second cleanup hole;
the diameter of the third cleanup hole allows a second oversized fastener to be inserted through the third cleanup hole
the diameter of the fourth cleanup hole allows a second standard fastener to be inserted through the fourth cleanup hole Clause 19. The step gage of clause 17, wherein the first section is positioned at a first end of the step gage, the second section is positioned between the first and third sections, the third section is positioned between the second and fourth sections, and the fourth section is positioned at a second opposing end of the step gage.

Clause 20. The step gage of clause 14, wherein the first and second sections are integrally formed.

Clause 21. A system for forming aligned holes, the system comprising:
a step gage comprising at least first and second sections of differing diameters, wherein each diameter of each section corresponds to a respective cleanup hole diameter; and
a tapered reamer comprising a tapered diameter section that tapers from a final diameter to a beginning diameter at angle between about 0.5 degrees and 1 degree per side, wherein said final diameter is approximately equal to the diameter of a second cleanup hole;
wherein said step gage is configured for insertion into a gap defined by misaligned holes for determining an appropriate cleanup hole diameter based on which of the first and second sections fits through the gap; and
wherein the tapered reamer is configured to form a cleanup hole having the diameter of the second cleanup hole.

Clause 22. The system of clause 21, wherein the step gage comprises at least a third section and a fourth section which correspond to a third cleanup hole diameter and a fourth cleanup hole diameter, respectively.

As is evident from the foregoing description, certain aspects hereof are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope hereof.

Other aspects, objects and advantages hereof can be obtained from a study of the drawings, the disclosure and the appended claims.

What is claimed is:

1. A method for forming a plurality of aligned holes, the method comprising:
   determining a diameter of a cleanup hole associated with a plurality of misaligned holes, the cleanup hole diameter corresponding to a fastener diameter;
   at least partially inserting a tapered reamer into a gap defined by the plurality of misaligned holes, the tapered reamer having a longitudinal axis and configured such that the longitudinal axis aligns with a center of the cleanup hole when the tapered reamer is inserted into the gap defined by the plurality of misaligned holes;
   reaming the plurality of misaligned holes with the tapered reamer to form the cleanup hole defined by the plurality of aligned holes having a same center and a same diameter.

2. The method of claim 1, wherein the step of determining a diameter of a cleanup hole further includes the steps of:
   inserting a step gage into the gap defined by the plurality of misaligned holes, the step gage including at least a first section having a first diameter and a second section having a second diameter smaller than the first diameter, the first diameter corresponding to a first cleanup hole diameter and the second diameter corresponding to a second cleanup hole diameter larger than the first cleanup hole diameter; and
   determining the diameter of the cleanup hole based on whether one or more of the first and second sections fit within the gap.

3. The method of claim 2, wherein the step of reaming the plurality of misaligned holes further comprises reaming the plurality of misaligned holes to form the cleanup hole having a first cleanup hole diameter, wherein the first cleanup hole diameter allows a first standard fastener to be inserted through the cleanup hole.

4. The method of claim 2, wherein the step of reaming the plurality of misaligned holes further comprises reaming the plurality of misaligned holes to form the cleanup hole having a second cleanup hole diameter, wherein the second cleanup hole diameter allows a first oversized fastener to be inserted through the cleanup hole.

5. A method for forming aligned holes, the method comprising:
   inserting a step gage into a gap defined by misaligned holes, the step gage including at least a first section having a first diameter and a second section having a second diameter smaller than the first diameter, the first diameter corresponding to a first cleanup hole diameter and the second diameter corresponding to a second cleanup hole diameter larger than the first cleanup hole diameter;
   when the first section fits through the gap, determining that a virtual hole diameter of the misaligned holes corresponds to a first standard fastener diameter, wherein a first standard fastener has the first standard fastener diameter; and
   when the first section does not fit through the gap and the second section does fit through the gap:
      determining that the virtual hole diameter of the gap is smaller than the first standard fastener diameter; and using a tapered reamer to form a second cleanup hole centered on a virtual hole associated with the virtual hole diameter, wherein the diameter of the second cleanup hole allows a first oversized fastener to be inserted through the second cleanup hole.

6. The method of claim 5, wherein the step gage further includes a third section having a third diameter smaller than the second diameter and a fourth section having a fourth diameter smaller than the third diameter, the third diameter corresponding to a third cleanup hole diameter larger than the second cleanup hole diameter and the fourth diameter corresponding to a fourth cleanup hole diameter larger than the third cleanup hole diameter, the method further comprising:

when the third section fits through the gap and the first and second sections do not fit through the gap:

determining that the virtual hole diameter of the gap defined by the misaligned holes corresponds to a third cleanup hole diameter;

using the tapered reamer to form an initial cleanup hole having the diameter of the second cleanup hole centered on the virtual hole associated with the virtual hole diameter; and using a first standard reamer to form a third cleanup hole having the third cleanup hole diameter centered on the geometric center of the initial cleanup hole, wherein the third cleanup hole diameter allows a second oversized fastener to be inserted through the third cleanup hole; and when the fourth section fits through the gap and the first, second, and third sections do not fit through the gap:

determining that the virtual hole diameter of the gap corresponds to a fourth cleanup hole diameter;

determining that a fourth cleanup hole having the fourth cleanup hole diameter centered on the virtual hole associated with the virtual hole diameter is appropriate, wherein the fourth cleanup hole diameter allows a second standard fastener to be inserted through the fourth cleanup hole.

7. The method of claim 6, wherein upon determining that the fourth section fits within the gap and that the first, second, and third sections do not:

forming the fourth cleanup hole centered on the virtual hole associated with the virtual hole diameter.

8. The method of claim 7, wherein the step of forming the fourth cleanup hole further comprises the steps of:

using the tapered reamer to form an initial cleanup hole having the diameter of the second cleanup hole centered on the virtual hole associated with the virtual hole diameter;

using the first standard reamer to form the third cleanup hole having the third cleanup hole diameter centered on the geometric center of the initial cleanup hole using a second standard reamer to form the fourth cleanup hole having the fourth cleanup hole diameter centered on the geometric center of the third cleanup hole.

9. The method of claim 7, wherein the step of forming the fourth cleanup hole further comprises the step of:

using a second standard reamer and a jig to form the fourth cleanup hole having the fourth cleanup hole diameter centered on the virtual hole associated with the virtual hole diameter.

10. The method of claim 5, wherein the step of using a tapered reamer further comprises the step of centering the reamer on the misaligned holes without the use of a jig.

11. A system for forming aligned holes, the system comprising:

a step gage configured to be inserted through a gap defined by misaligned holes to determine a diameter of a cleanup hole, said step gage comprising:

a first section having a first diameter corresponding to a first cleanup hole diameter; and a second section having a second diameter corresponding to a second cleanup hole diameter larger than the first cleanup hole diameter, the first and second sections being connected and extend in series along a longitudinal axis of the step gage; and a tapered reamer having a longitudinal axis and configured such that the longitudinal axis aligns with a center of the cleanup hole when the tapered reamer is at least partially inserted into the gap defined by the misaligned holes.

12. The system of claim 11, wherein the step gage further comprises at least a third section and a fourth section which correspond to a third cleanup hole diameter and a fourth cleanup hole diameter, respectively.

13. The system of claim 11, wherein said tapered reamer comprises a tapered diameter section having a beginning diameter which is smaller than a final diameter, the tapered diameter section tapering from the final diameter to the beginning diameter at an angle of between about 0.5 degrees and about 1.0 degrees per side.

14. A system for connecting at least two objects together, comprising:

a step gage comprising:

a first section having a diameter equal to about twice a diameter of an intended hole, minus a diameter of a first cleanup hole; and a second section having a diameter equal to about twice the diameter of the intended hole, minus a diameter of a second cleanup hole which is larger than the diameter of the first cleanup hole, wherein said first section and said second section are connected and extend in series along a longitudinal axis of the step gage; and a fastener configured to be inserted through a first hole in a first object and a second hole in a second object to secure the first object and the second object together, the first hole and the second hole comprising at least one of the first cleanup hole and the second cleanup hole.

15. The system of claim 14, wherein the fastener is a first standard fastener, and the diameter of the first cleanup hole allows the first standard fastener to be inserted through the first cleanup hole.

16. The system of claim 14, wherein the fastener is a first oversized fastener, and the diameter of the second cleanup hole allows the first oversized fastener to be inserted through the second cleanup hole.

17. The system of claim 14, further comprising:

a third section having a diameter equal to about twice the diameter of the intended hole, minus a diameter of a third cleanup hole which is larger than the diameter of the second cleanup hole; and a fourth section having a diameter equal to about twice the diameter of the intended hole, minus a diameter of a fourth cleanup hole which is larger than the third cleanup hole; and wherein the first, second, third, and fourth sections are connected and extend in series along the longitudinal axis of the step gage.

18. The system of claim 17, wherein:

the diameter of the intended hole is approximately equal to the diameter of the first cleanup hole;

the diameter of the second cleanup hole allows a first oversized fastener to be inserted through the second cleanup hole;

the diameter of the third cleanup hole allows a second oversized fastener to be inserted through the third cleanup hole; and the diameter of the fourth cleanup hole allows a second standard fastener to be inserted through the fourth cleanup hole.

19. The system of claim 17, wherein the first section is positioned at a first end of the step gage, the second section is positioned between the first and third sections, the third section is positioned between the second and fourth sections, and the fourth section is positioned at a second opposing end of the step gage.

20. The system of claim 14, wherein the first and second sections are integrally formed.

\* \* \* \* \*